United States Patent [19]

Peritz

[11] Patent Number: 5,785,468
[45] Date of Patent: Jul. 28, 1998

[54] DRILL FOR INTERCHANGEABLE USE ON A SCREW DRIVER

[76] Inventor: Mark Peritz, P.O. Box 503, Woodstock, N.Y. 12498

[21] Appl. No.: 635,636

[22] Filed: Apr. 22, 1996

[51] Int. Cl.$^6$ .................................... B23B 51/10
[52] U.S. Cl. ............... 408/226; 408/239 R; 408/239 A; 279/79; 7/165; 7/158
[58] Field of Search ............ 77/165, 158; 408/239 R, 408/238, 226, 225, 224, 239 A; 279/14, 79, 22

[56] References Cited

U.S. PATENT DOCUMENTS

| | | | |
|---|---|---|---|
| 524,906 | 8/1894 | McDougall | 7/165 |
| 751,345 | 2/1904 | Saunders | 279/22 |
| 1,181,383 | 5/1916 | Haeseler | 279/22 |
| 2,522,388 | 9/1950 | Madsen | 279/79 |
| 3,023,015 | 2/1962 | Pankow | 279/14 |
| 3,932,904 | 1/1976 | Nilsson et al. | 7/14.1 R |
| 3,965,510 | 6/1976 | Ernst | 7/165 X |
| 3,973,784 | 8/1976 | Smith | 408/239 A |
| 4,320,544 | 3/1982 | Bryant et al. | 7/158 |
| 4,573,839 | 3/1986 | Finnegan | 408/239 |
| 4,629,375 | 12/1986 | Lieser | 408/239 R |
| 4,796,319 | 1/1989 | Taft | 7/158 |
| 5,038,435 | 8/1991 | Crawford et al. | 7/158 X |
| 5,222,848 | 6/1993 | Kuang-Wu | 7/165 X |
| 5,470,180 | 11/1995 | Jore | 7/165 X |

OTHER PUBLICATIONS

Chuck–Mate Drill–N–Drive Screw Driving System–Backer.

*Primary Examiner*—Daniel W. Howell
*Assistant Examiner*—Henry W. H. Tsai

[57] ABSTRACT

A drill for interchangable use on a screw driver bit. The drill is mounted on shank, the shank having an opening at the end remote from the drill for rapid placement of the shank on and removal of the shank from the screw driver bit locked in the chuck of an electric powered rotating unit to permit drilling a screw hole and then, upon removal of the drill from the screw driver bit using the screw driver bit for installation of a screw. A countersink may be also be mounted on the shank with the drill.

9 Claims, 2 Drawing Sheets

DRILL FOR INTERCHANGEABLE USE ON A SCREW DRIVER

BACKGROUND OF THE INVENTION

In recent years, the use of screws to replace nails in various forms of construction has broadly expanded. It was always recognized that screws were the superior fastener compared to nails but turning screws into place was always time consuming and difficult in comparison to the pounding of nails. Recently, electric rotating units have become readily available having a chuck and using batteries which are rechargeable as the power source. Such electric rotating units frequently are also used as electric drills and as screw drivers. This provides to the craftsman complete freedom to move rapidly from one point of operation to another without being limited by an electric cord thus making the electric powered rotating unit for the installation of screws most attractive and permits the rapid and convenient placement of screws. As a result, the use of screws has become easier and faster than driving nails. One construction operation that now frequently uses screws rather than nails is the installation of dry wall board. Screws, frequently referred to as dry wall screws, are now available commercially in quantities and at a price that permits wide spread usage of such screws rather than nails.

One factor which makes installation of any material with screws both rapid and easy is that the opening in which the screw is placed is first formed and, to eliminate the protrusion of the head of the screw above the surface of the material being installed, the hole is normally countersunk in the same operation as the formation of the screw hole. The screw is then inserted and turned into the opening which has a length which permits the screw to be made tight but with the least amount of effort. This is accomplished by use of the electric powered unit with a chuck which for the greatest convenience and economy is the same electric powered unit that formed the hole in which the screw is placed. To convert a drill or drill-countersink to a screw driver bit by opening the jaws of the chuck commonly used for holding such devices, is very time consuming and would substantially diminish the benefit of the electric powered unit. One solution is to use two electric powered units either battery powered or electric powered units connected to an available electric supply, but such units, even beyond expense, are heavy enough to have to be put down and picked up and cannot be easily held by a worker while the other unit is being used.

A device is needed which permits a worker rapidly to convert one electric powered unit from a drill or drill-countersink to a screw driver and back again to a drill or drill-countersink without having to bend down to store one unit while picking up another and most decidedly without having to open and close the chuck to change bits.

This invention provides a device which leaves the screw driver bit in the chuck of the electric-powered unit and permits a drill or countersink and drill to be quickly and easily and safely placed over the screw driver bit and then be easily removed and placed in a pocket or pouch of the worker when not in use. The device is inexpensive to build and is safe to use.

The need is very great for such a device and attempts have been made to create such a device. One recently commercially available device provides the countersink and drill but instead of the shank being slid on and off the screw driver bit, three prongs are provided which fit between the jaws of the chuck of the electric-powered unit with the screw driver bit locked in place in the chuck. Since the prongs would be destructive to the hands, a holder is provided in the form of a disc mounted to be rotatable on the prongs. Although this device does help with the need to have a means quickly to convert back and forth from a drill-countersink and a screw driver, it does not do so with a device that is as safe and durable as is the device in accordance with this invention.

SUMMARY OF THE INVENTION

In accordance with the present invention, a shank is provided which is most preferably, for safety reasons, cylindrical with a smooth surface. At one end, a drill or countersink and drill is concentrically mounted. At the other end, there is an opening, also concentrically located with the longitudinal axis of the shank. The screw driver bit fits securely into the opening and provides a positive drive for the drill or countersink-drill on the opposite end of the shank. A ball-lock is preferably installed on the screw driver bit to assure safe retention in the shank of the bit while not making removal of the shank overly difficult.

It is an object of the present invention to provide a device which can rapidly and easily convert an electric-powered unit with a screw driver bit in the chuck into a drill with or without a countersink.

It is a further object of the present invention to provide such a device that is also inexpensive.

It is still a further object of the present invention to provide such a device which is safe to use.

The subject mater of the present invention is particularly pointed out and distinctly claimed in the concluding portion of the specification. However, both the organization and method of operation, together with further advantages and objects thereof, may best be understood by reference to the following description taken in connection with the accompanying drawings wherein like reference characters refer to like elements.

DETAILED DESCRIPTION OF THE INVENTION

Figure 1:
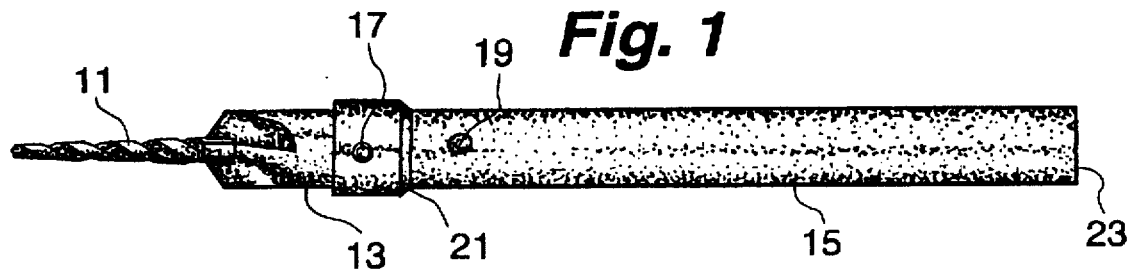
FIG. 1 is a side elevation of the device showing the shank with the drill and countersink mounted thereon.
Figure 2:
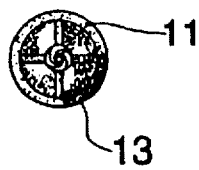
FIG. 2 is an end view showing the end with the drill and the countersink.

Referring now to FIG. 1, the device is shown with a drill 11 mounted in a countersink 13 and with the countersink 13 mounted on a shank 15. The countersink 13 is used to form an opening at the top of a screw opening formed by the drill 11. The drill 11 is preferably removable from the countersink 13 by means of a set screw 17. This permits replacement of the drill 11 which can break in use and which also ultimately becomes dull and needs replacement. The countersink 13 can be permanently affixed to the shank 15 and replacement is not as critical as with the drill 11 but still preferably, the countersink 13 is secured to the shank 15 by means of a set screw 19 in which case an opening (not shown) is required in the shank 15 and the countersink 13 needs to have a shaft (not shown )extending concentrically from the countersink 13. However, any number of ways can be found to affix the countersink 13 to the shank 15. As an alternative, the countersink 13 can be replaced by a collar similar to the countersink but without the cutting edges of the countersink 13.

The shank 15 has two ends, namely a working end 21 and a mounting end 23. Both the working end 21 and the mounting end 23 are substantially at right angles to the longitudinal axis of the shank 15. The countersink 13 is secured to the working end 21. The shank 15 most preferably is cylindrical and has a smooth surface. This is very important so that if the operator touches the shank 15 when in operation, no injury will occur and a light grasp or permitting the shank 15 to rest on the hand of the operator when commencing drilling to guide the drill to the correct point is readily workable without injury.

Figure 3:
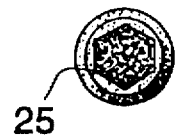
FIG. 3 is an end view showing the opening at the end of the shank opposite from the drill and countersink.
Figure 5:
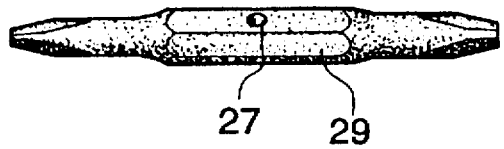
FIG. 5 is a side elevation of a screw driver bit showing the recommended ball lock.

Referring to FIG. 3, the mounting end 23 is shown with an opening 25 located in the shank 15 at the mounting end 23. The opening 25 is concentrically located along the longitudinal axis of the shank 15. The depth of the opening 25 is limited and the opening 25 extends only a minor portion of the length of the shank 15. Referring to FIG. 5, a lock ball 27 is shown mounted on a screwdriver drill bit 29 so that the screw driver bit 29 will be retained snugly within the opening 25.

Figure 4:
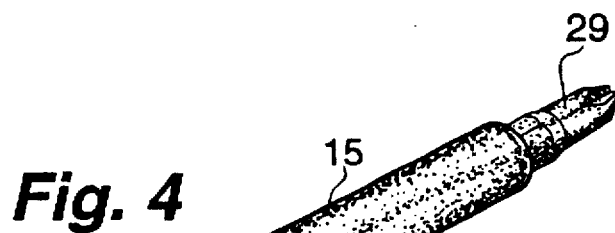
FIG. 4 is pictorial view of the device with a screw driver bit located in the opening of the shank and showing the drill and countersink.
Figure 6:
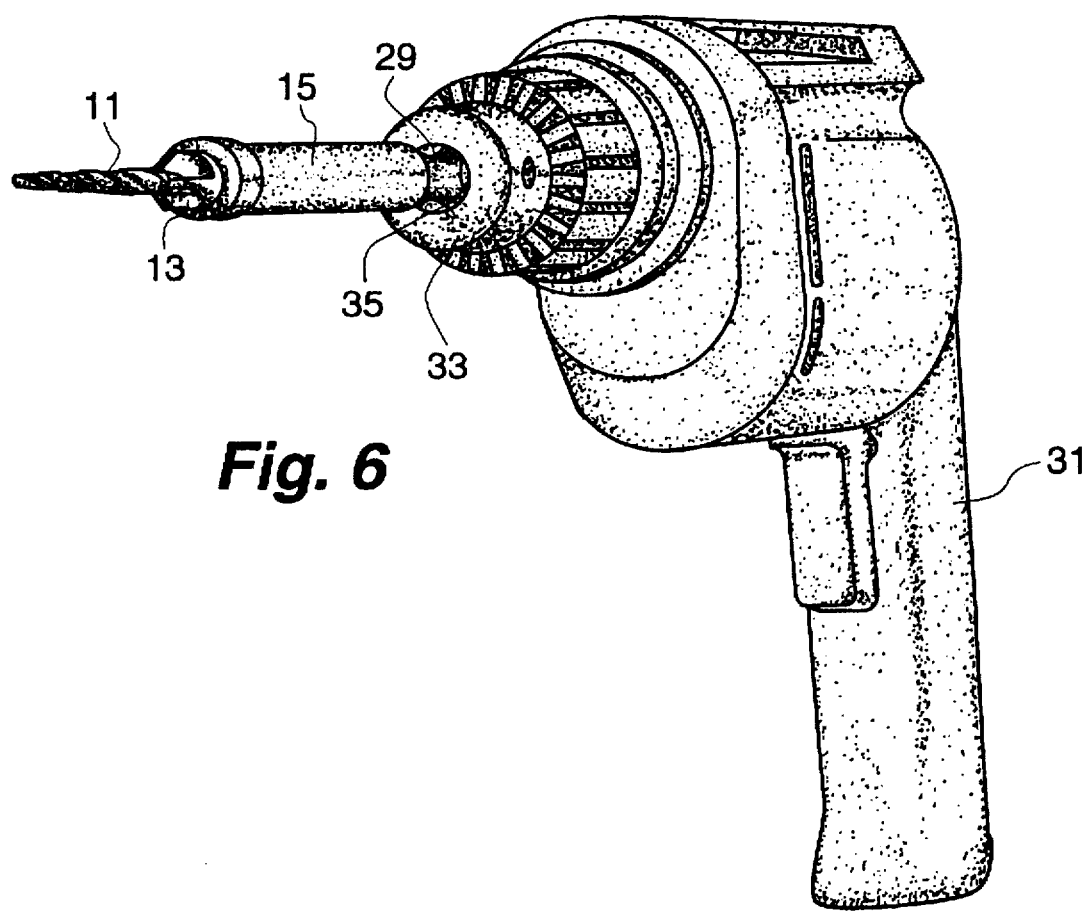
FIG. 6 is a pictorial view of an electric powered rotating unit with chuck and with a screw driver bit secured in the chuck and the countersink and drill with the shank mounted on the screw driver bit.

Referring now to FIGS. 4 and 6, a screw driver bit 29 is shown mounted in the opening 25 at the mounting end 23 of the shank 15. Such screw driver bits 29 are commercially available and are intended for use with an electric powered rotating unit 31 with a chuck 33 in which drills and bits operated by rotation are placed. The chuck 33, as is known, is operated with a key (not shown) and includes jaws 35 which grip whatever tool is placed therein. Screw driver bits 29 are generally made with a hexagonal cross section. For this reason, the opening 25 in the mounting end 23 of the shank 15 preferably also has a hexagonal cross section. The cross section of the opening 25 and the screw driver bit 29 must match and the opening 25 must be sufficiently larger to permit easy introduction of the screw driver bit 29 into the opening 25 while still insuring a firm fit. The lock ball 27 on the screw driver kit 29 assures a firm fit while still permitting insertion and removal with reasonable force.

The operation of the device can be best understood by referring to FIG. 6. With the device mounted on the screw driver bit 29, the operator can drill a hole with the drill 11 and provide the countersink opening with the countersink 13. Then, with the screw inserted into the hole just drilled, the shank 15 is pulled off the screw driver bit 29 and the screw driver bit 29 is then used to turn down the screw. The shank 15 is then returned to being mounted on the screw driver bit 29 and the operation repeats providing a fast way to convert from a countersink and drill operation to setting the screw in the hole formed and then repeating the operation.

Thus, while a preferred embodiment of the invention has been shown and described, it will be apparent to those skilled in the art that many other changes and modifications may be made without departing from the invention in its broader aspects. The appended claims are therefore intended to cover all such changes and modifications as fall within the true spirit and scope of the invention.

I claim:

1. A countersink and drill for interchangeable use on a screw driver bit secured in the chuck of a powered drill, the countersink and drill comprising:

a shank which is cylindrical and elongated having a working end and a mounting end, said shank having a longitudinal axis extending from the working end to the mounting end and having an opening at the mounting end and extending from the mounting end along the longitudinal axis, the opening having a multisided cross section;

a countersink mounted on the working end of the shank;

a drill mounted concentrically in the countersink;

a set screw mounted in the countersink to retain the drill in place; and a screw driver bit having a multisided cross section for insertion into the opening at the mounting end of the shank whereby the shank with the countersink and drill may be removed from the screwdriver bit to permit use of the screwdriver bit and whereby the shank may be placed on the screw driver bit to use the drill and countersink, the screw driver bit including means for retaining the shank on the screw driver bit.

2. A countersink and drill according to claim 1 wherein the multisided cross-section of the opening and the screw driver bit is a hexagonal cross section.

3. A countersink and drill according to claim 1 further including a locking means for holding the shank on the screw driver bit during operation.

4. A countersink and drill according to claim 1 wherein the multisided cross-section of the opening and screw driver bit is a hexagonal cross section and further including a locking means for holding the shank on the screw driver bit during operation.

5. A drill for interchangeable use of a screw driver bit secured in the chuck of a powered drill, the drill comprising:

a shank which is cylindrical and elongated having a working end and a mounting end, said shank having a longitudinal axis extending from the working end to the mounting end and having an opening at the mounting end and extending from the mounting end along the longitudinal axis, the opening having a multisided cross section:

a collar means secured to the working end of the shank; and a drill mounted concentrically in the collar means;

a set screw mounted in the collar means to retain the drill in place; and a screw driver bit having a multisided cross section for insertion into the opening at the mounting end of the shank whereby the shank with the drill may be removed from the screw driver bit to permit use of the screw driver bit and whereby the shank may be placed on the screw driver bit to use the drill, the screw driver bit including means for retaining the shank on the screw driver bit.

6. A drill according to claim 5 wherein the multisided cross section of the opening and screw driver bit is a hexagonal cross section.

7. A drill according to claim 5 further including a locking means for holding the shank on the screw driver bit during operation.

8. A countersink and drill according to claim 5 wherein the multisided cross section of the opening and screw driver bit is a hexagonal cross section and further including a locking means for holding the shank on the screw driver bit during operation.

9. A countersink and drill for interchangeable use on a screw driver bit secured in the chuck of a powered drill, the countersink and drill comprising:
- a shank which is cylindrical and elongated having a working end and a mounting end, said shank having a longitudinal axis extending from the working end to the mounting end and having an opening concentrically located along the longitudinal axis at the mounting end along the longitudinal axis a minor portion of the length of the shank, the opening having a hexagonal cross section, the working end having an opening concentrically along the longitudinal axis, the working end and the mounting end being at substantially right angles to the longitudinal axis;
- a countersink mounted in alignment with the longitudinal axis on the working end of the shank, the countersink having a shaft mounted in the opening at the working end of the shank;
- a set screw mounted in the shank for retaining the shaft of the countersink in the shank;
- a drill mounted concentrically in the countersink;
- a set screw mounted in the countersink to retain the drill in the countersink;
- a screw driver bit having a hexagonal cross section for insertion into the opening at the mounting end of the shank whereby the shank with the countersink and drill may be removed from the screwdriver bit to permit use of the screwdriver bit and whereby the shank may be placed on the screw driver bit to use the drill and countersink, the screw driver bit having a locking means to secure the screw driver bit within the opening at the mounting end.

* * * * *